(12) United States Patent
Kudelski et al.

(10) Patent No.: US 7,502,473 B2
(45) Date of Patent: Mar. 10, 2009

(54) PROCESS FOR MANAGING THE HANDLING OF CONDITIONAL ACCESS DATA BY AT LEAST TWO DECODERS

(75) Inventors: Henri Kudelski, Grandvaux (CH); Corinne Le Buhan, Les Paccots (FR); Guy Moreillon, Bioley-Orjulaz (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 681 days.

(21) Appl. No.: 10/850,107

(22) Filed: May 21, 2004

(65) Prior Publication Data

US 2005/0188398 A1  Aug. 25, 2005

(30) Foreign Application Priority Data

Feb. 25, 2004  (CH) .................................. 00308/04

(51) Int. Cl.
*H04N 7/167* (2006.01)
(52) U.S. Cl. .................. 380/233; 380/230; 380/231; 380/232; 726/27; 726/28; 726/29; 726/30; 726/31; 725/2; 725/25; 725/31; 725/100
(58) Field of Classification Search ............. 726/26–33; 380/230–233; 725/2, 25, 31, 100
See application file for complete search history.

(56) References Cited

U.S. PATENT DOCUMENTS

| 4,633,309 | A  | * | 12/1986 | Li et al. .................. 380/242 |
| 5,748,732 | A  | * | 5/1998  | Le Berre et al. ............. 380/229 |
| 6,405,369 | B1 | * | 6/2002  | Tsuria ........................... 725/6 |
| 7,117,534 | B2 | * | 10/2006 | Candelore .................... 726/26 |
| 2002/0126844 | A1 | * | 9/2002 | Rix et al. ..................... 380/211 |
| 2003/0097563 | A1 | * | 5/2003 | Moroney et al. ............ 713/170 |
| 2003/0179874 | A1 | * | 9/2003 | Anders et al. .......... 379/220.01 |
| 2005/0033964 | A1 | * | 2/2005 | Albanese et al. ............ 713/171 |
| 2005/0152545 | A1 | * | 7/2005 | Desmicht et al. ............ 380/210 |

\* cited by examiner

*Primary Examiner*—Kambiz Zand
*Assistant Examiner*—Amare Tabor
(74) *Attorney, Agent, or Firm*—Harness, Dickey & Pierce

(57) ABSTRACT

One embodiment of the invention relates to a management method for conditional access data processing by at least three decoders associated to a subscriber. These decoders include activation/deactivation means for conditional access data processing and local communication means structured to allow communication between the subscribers' decoders. This method comprises a reception step, a determination step, and a comparison step. In addition conditional access data processing by said first decoder (STB) is deactivated if the latter has not received messages from the required number of different decoders. Another embodiment of the invention relates to a decoder that allows the implementation of the method according to the invention and characterized in that it includes local communication means (10) structured to transmit messages to other decoders and to receive messages originating from said other decoders, and processing means for messages received by said local communication means (10).

17 Claims, 2 Drawing Sheets

PROCESS FOR MANAGING THE HANDLING OF CONDITIONAL ACCESS DATA BY AT LEAST TWO DECODERS

PRIORITY STATEMENT

This application claims priority under 35 U.S.C. § 119 of Swiss Patent Application No. CH00308/04, filed on Feb. 25, 2004, in the Swiss Institute of Intellectual Property (IGE), the entire contents of which are incorporated herein by reference.

BACKGROUND

1. Field of the Invention

This invention concerns a management method for conditional access data processing by at least two decoders, particularly in the field of access to Pay-TV events. It also concerns a decoder for carrying out this process.

2. Description of the Related Art

Generally, to be able to access an encrypted content corresponding to events broadcasted by Pay-TV operators, such as films, sports events or the like, it is necessary to purchase a subscription, a decoder and a security module. Some subscribers wish to have several decoders and several security modules so that several users can access broadcasted events from several televisions placed in different parts of their home.

In this case, the price asked for supplementary subscriptions, decoders and/or security modules is generally lower than the price asked for the first subscription, decoder and/or security module. However, the aim is to avoid a subscriber purchasing several decoder/security module units, by taking advantage of the price reduction for supplementary units and that he enables a non-subscriber third party taking advantage of this reduction or that he re-sells these units at a lower price than the normal purchase price.

A solution to avoid this situation consists in the imposition of operating conditions so that a decoder that has been removed from its environment no longer allows the decryption of encrypted content, while the same decoder operates in a conventional way as long as it remains in its environment. Thus, a decoder that has been resold or given to a third part cannot function.

A system allowing part of this aim to be achieved is described in the European patent published under the number EP 0 826 288. This patent describes a Pay-TV system in which a subscriber has at least two decoders, each decoder being associated to a smart card intended to allow the decryption of the content sent to the decoders connected to the television system. Each smart card contains a certain amount of data that allow its identification. This information, called "chaining data", is for example a signature, a key or another determination element. All the cards connected to the same subscriber have at least one chaining data in common. The cards of different subscribers do not have any data in common.

The subscriber's smart cards, or at least one of them, are deactivated after a certain duration of use. The content sent to the decoder in question can no longer be decrypted. A deactivated card can be reactivated if the subscriber has another card that is still active and has a decoder connected to the same subscriber. To implement this, the system according to this invention operates in the following way. The data connected to an active card is first stored in the decoder into which this card is introduced. When a card is deactivated, it must be introduced into a decoder associated to an active card of the subscriber. The chaining data such as the signature, the key, etc., stored in the decoder, are authenticated with the deactivated card chaining data. If this data matches, the card is reactivated for a certain time duration. If the chaining data does not match, the card is not reactivated.

In this system, any decoder connected to an active card of the subscriber can allow the reactivation of a deactivated card of the same subscriber. In this way, if the subscriber's cards have been sold to people geographically close to the original subscriber, the people with a deactivated card can introduce this card into any decoder connected to an active card of the subscriber in order to re-start functioning. The deterrent effect aimed for in this invention is thus only partially achieved. Furthermore, reactivation must be carried out regularly and requires manipulation on the part of the user. These constraints are generally little appreciated by "honest" users. Moreover, there is a significant risk of wrong operation or of card loss.

Moreover, there is another simple way to avoid the constraints related to the process of this patent. In fact, it is sufficient for the buyer of an unauthorized decoder/smart card unit to purchase two units. Thus, a card can always be reactivated when it has been deactivated.

BRIEF SUMMARY OF THE INVENTION

The present invention proposes to offer a more reliable and autonomous solution that ensures that only the decoders actually used by a legitimate subscriber function correctly and allow the decryption of encrypted events. Furthermore, this solution does not require any manipulation on the part of the honest user.

According to this invention, a decoder and the associated security module function transparently for the authorized user, as long as they remain in their "usual" environment. This means that the user will not need to carry out any type of manipulation, in particular, periodic reactivation of the security module is not necessary as long as the decoder and security module remain in their environment.

On the contrary, in the case of "unusual" use, in particular when the decoder/security module has been resold, the decryption of the data is not authorized and is automatically stopped.

The aim of the invention is reached by means of a management method for conditional access data processing by at least two decoders associated to a subscriber and including activation/deactivation means for conditional access data processing and local communication means structured to allow communication between subscribers' decoders, this process comprising the following steps:

reception by a first decoder's local communication means of at least one message originating from at least one second decoder associated to said subscriber;

determination of a minimum number of different decoders of said subscriber from which said first decoder must receive messages;

comparison between, on one hand the number of different decoders from which said first decoder has received a message, and on the other hand the minimum number of decoders from which said first decoder must receive a message;

deactivation of the conditional access data processing by said first decoder if it has not received messages from the required number of different decoders.

This aim is also reached by a decoder provided for conditional access data processing, this decoder being associated to a subscriber and includes activation/deactivation means for processing this conditional access data and local communication means structured to allow local communication between said decoder and at least one other decoder associated to said subscriber, characterized in that it includes:

means for processing messages received by locals communication means (10), these processing means being structured to determine which decoder (STB) of the subscriber has issued the message;

determination and storage means of a minimum number of different decoders of said subscriber from which said decoder must receive messages;

comparison means between on one hand the number of different decoders from which said decoder has received a message and on the other hand the minimum number of decoders associated to the subscriber, from which said decoder must receive a message.

In a simplified way, the process according to the invention allows the determination of whether the decoders are within the same proximity. If this is the case, the decoders function in a conventional way. On the other hand, if one of the decoders is displaced, for example by another user, this decoder will be deactivated and will longer be capable of decrypting encrypted data. The other decoders belonging to this subscriber will function normally so that it is possible to displace a decoder in order to undergo repairs, without therefore blocking all the subscriber's decoders.

BRIEF DESCRIPTION OF THE DRAWINGS

The invention will be better understood thanks to the following detailed description that refers to the enclosed drawings given as a non-limitative example, in which.

DETAILED DESCRIPTION OF THE INVENTION

Figure 1:
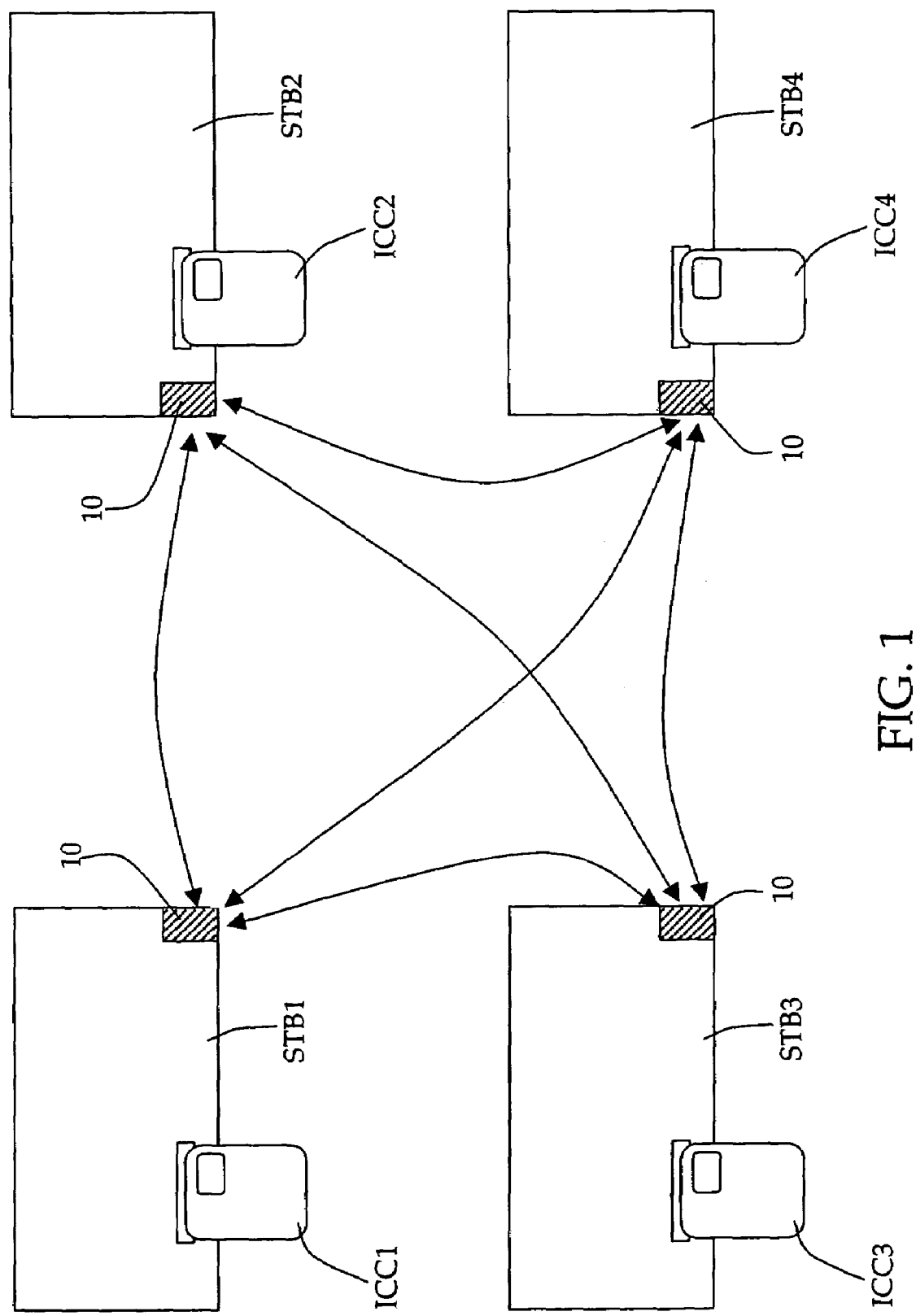
FIG. 1 shows elements allowing the implementation of two embodiments of the process of the invention.

The invention is described below with reference to several embodiments, in which it is supposed that a determined subscriber disposes of several decoders STB1, STB2, STB3, . . . each including a security module ICC1, ICC2, ICC3, . . . , which can for example be produced in the form of a microprocessor card or smart card or in the form of an integrated circuit case.

In the illustrated embodiments, the subscriber has four decoder/security module units. The process of the invention is applicable from the moment a subscriber disposes of at least two decoder/security module units. The upper limit does not exist from the technical point of view, but is generally fixed by the operator. In principle this is comprised between 5 and 10 decoders per subscriber. It should be noted that in the following text, the term decoder is to be understood in the wider sense, that is to say as an element allowing the decryption of conditional access data. This data can concern Pay-TV events, but also any other application in which it is necessary to decrypt data in order to access a service. The described embodiment examples essentially concern Pay-TV. In this field, the term decoder can be used to designate the decoder or only the security decoder/module unit, except if the context indicates that these terms must be distinguished.

The decoders as used all include local communication means 10 structured to transmit and receive signals or data originating from other decoders in the vicinity. Local communication is possible over a range of approximately a few hundred meters, so that the decoders placed in the same flat can communicate between each other while decoders placed in different flats in principle cannot communicate.

The communication means 10 are of well-known types and use radio frequencies in such a way as to form a wireless network. Each decoder/security module unit, or abbreviated, each decoder, alternatively plays the role of emitter and receiver, so that the process of the invention is identical, regardless of the decoder from which it is analysed.

The process of the invention according to a first embodiment operates in the following way: In a first instance, one of the decoders, for example the decoder STB1 acts as the emitter and sends a message by local communication means. This message can contain a variable as well as a single identifier corresponding either to the decoder or to the security module used. The variable changes from one message to another. Therefore, it is not possible to store a message and re-send this message several times by means of a falsified decoder, by passing itself off as a real decoder. This variable can be a numerical value such as a counter value or for example the hour and issue date of the message. The message can possibly contain an identifier corresponding to a subscription number. This identifier allows recognition of whether a message originates from a decoder connected to the same subscriber to which the decoder that has received the message belongs or if it belongs to another subscriber. This can occur, for example, when the decoders of different subscribers are close, in particular in two flats near to each other. This message is encrypted in such a way that it can be decrypted by other decoders belonging to the same subscriber. For this, a subscriber's decoder/security module can dispose of a table of keys, of the type public key, private key, or of a network key common to all the decoders or security modules of a subscriber and different for each subscriber.

When one of the decoders acts as an emitter, the other acts as a receiver. Therefore, these receive the emitter decoder STB1 message by means of local communication means and are processed as explained in the following.

In a first instance, it is verified if the message is well directed to the decoder that is to receive said message. This can be carried out in a well-known way, by using a plaintext header in the message. Then, the required decryption key is determined. This key can be the network key, which is identical for all the decoders/security modules of a subscriber or can be a specific key that depends on the pair decoder emitter/receiver. This message is then decrypted and the pertinent data that it contains is stored in the decoder or the security module. Among the pertinent data, there is notably the variable, which can correspond to the issue date and the hour, as well as the decoder identifier that has issued the message.

From the point of view of a decoder that plays the role of the receiver, all the messages that involve said decoder are thus stored, for a further verification stage.

The decoders include a table of parameters containing the values used for this verification stage. These parameters are in particular the maximum working duration of a decoder/security module unit without receiving communication from other network decoders, hereinafter called "isolation duration", as well as the minimum number of different decoders from which messages must originate, named hereinafter "number of transmitting decoders". Other parameters can be contained in this table of parameters, as in particular the number of decoders belonging to the subscriber or belonging to the same network.

In the process of the invention, each decoder operates as long as it receives messages from other decoders of the same subscriber, according to the conditions that are explained in details below. When a decoder no longer receives messages from other decoders, it is deactivated so that the decryption of encrypted content is no longer authorized.

The isolation duration parameter allows choosing the duration for which a decoder no longer receiving messages from other decoders can function, before the decryption of encrypted content is prevented. This duration can be fixed for example to 48 hours, which allows a subscriber to use one of his decoders during these 48 hours, out of range of the local communication means of his other decoders. If after having passed this 48 hour duration, the decoder has not received the necessary messages, originating from the local communication means of other decoders of the same subscriber, the decryption of encrypted content is prevented.

The parameter describing the minimum number of decoders from which messages must originate, or "number of emitter decoders" can be fixed by the operator and depends generally on the number of decoders belonging to the subscriber. According to an advantageous embodiment, this number of transmitter decoders corresponds to the "absolute majority" of the decoders minus one, which means that if the number of decoders is even, it is equal to half of the number of decoders and if it is odd, it is equal to half of the number of decoders, rounded to the lower value. In concrete terms, the minimum number of transmitter decoders is equal to 1 for a subscriber having 3 decoders, to 2 for a subscriber having 4 or 5 decoders, to 3 for a subscriber having 6 or 0.7 decoders, etc. The particular case where the subscriber disposes of two decoders is described later.

A point must be added with reference to the number of emitter decoders. In practice, the intention is to form a network between the different decoders of a subscriber, this network including a "number of participants" corresponding to the absolute majority of decoders of this subscriber. The number of transmitter decoders is equal to the number of participants minus one, due to the fact that a decoder does not send messages to itself.

The parameter for the number of decoders belonging to the subscriber is optional. It can serve on one hand to verify that the subscriber does not link more decoders than the maximum authorized by the operator, and on the other hand, to calculate the minimum number of participants.

The previously mentioned verification step develops in the following way: the decoder that carries out the verification determines if, for a duration corresponding to the isolation duration, the decoder has received messages originating from a different number of decoders corresponding to at least a number of transmitter decoders.

As an example, if the isolation duration is 48 hours and the minimum number of transmitter decoders is 3, each decoder must have received messages from at least 3 different decoders in the last 48 hours. If one of the decoders does not fulfil these criteria, the decryption of the data is deactivated in this decoder.

The aim of establishing a minimum number of participants corresponding to at least the absolute majority of the number of decoders is to prevent the creation of two autonomous operational networks, from a network of only one subscriber. Without the aforementioned condition, it would be possible to take a certain number of decoders from a network of a subscriber and recreate a new network, both networks then functioning independently, for example with two different users.

The message transmission frequency for each decoder can be chosen freely, provided of course that it is lower than the isolation duration.

According to a concrete embodiment, this frequency can be, for example, one message per minute. In this case, only the last message originating from each different decoder is stored in the "receiver decoder". The variable contained in the message is compared to variables originating from other messages. A message is considered to be valid if the variable is different to the variables in the other messages. This means that, if a message is stored and then returned with the same variable, it will not be considered as valid and will not be taken into account with the messages received in the course of the isolation duration.

When a decoder/security module unit is deactivated because it has not received the minimum number of messages during the isolation duration, which can for example occur when the decoder has been switched-off during a longer period than the isolation duration or when it has been withdrawn from the network to undergo repairs in particular, it is necessary to reactivate it at the moment when it is reintegrated into the network. This can be carried out in two ways, namely automatically or on request.

In the case where the reactivation is automatic, it is sufficient to supply the decoder and wait until it has received messages originating from different decoders corresponding to at least the minimum number of emitter decoders. This embodiment is of interest due to the fact that it does not require any manipulation at the time of reactivation. On the other hand, it is necessary either to send messages at relatively high frequencies, for example a message per minute and per decoder, even if the isolation duration is much longer, or to wait a relatively long time until the reactivation takes effect.

In the manual embodiment, it is necessary, when a decoder/security module unit is reintegrated into an existing network, to force communication with the other decoders of the network. This can be carried out by sending a message through the local communication means from the decoder that is to be reintegrated, this message requiring a response from all the decoders that have received said message. In this embodiment, it is possible to provide decidedly higher message sending frequencies in normal operational conditions, for example a message every hour, since it is possible to force the sending of messages at the time of decoder reactivation.

Provision can also be made for a decoder to be supplied after a supply cut, it sends a request to the other decoders requesting them to transmit a message. This embodiment corresponds to a reactivation on request, but which is invisible to the user since it does not require any manipulation on the part of the latter.

In the embodiment described above, if one of the decoders is switched-off when another decoder is being reactivated, the latter does not receive the messages of the decoder that is switched-off. In certain configurations, this can prevent the reactivation of the decoder.

A second embodiment of the invention, which uses the elements in FIG. 1, allows the resolution of this problem. In this embodiment, the messages received by each decoder are stored in this decoder or in the associated security module. These messages can in turn be retransmitted to another decoder, so that each decoder can serve as a relay.

As an example, one wishes to reactivate the decoder STB3 while the decoder STB2 is switched-off. The decoder STB1 has stored the STB2 decoder message that the latter had sent before being switched-off. When the decoder STB3 is reintegrated into the network, it receives a direct message from the decoder STB1 and an indirect message from the decoder STB 2, sent by STB 1. By integrating the date and the hour in the messages, it is possible to determine if the latter are sufficiently recent to authorize the reactivation of the decoder.

Figure 2:
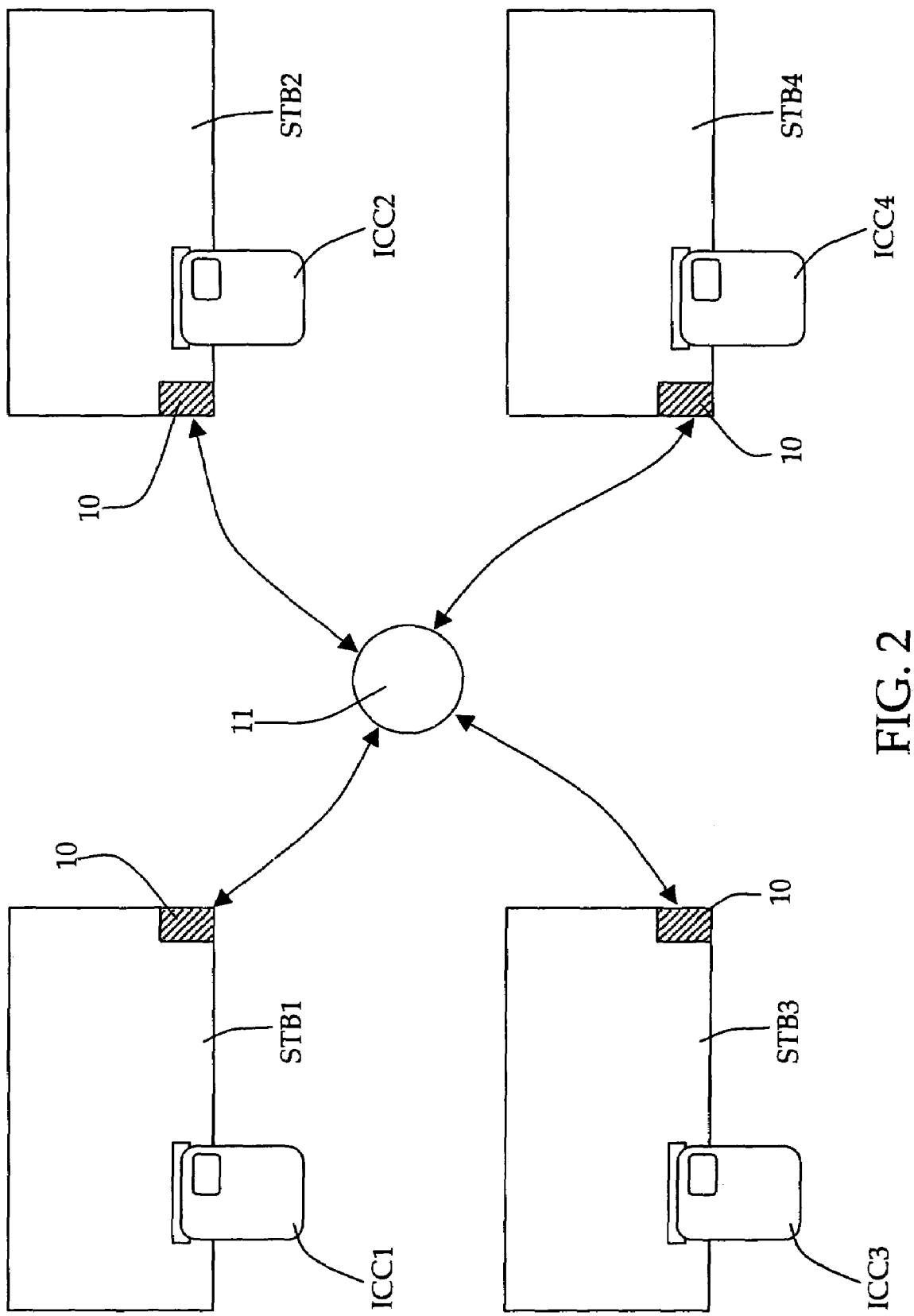
FIG. 2 represents the elements for the implementation of another embodiment of the process of the invention.

In a third embodiment of the invention, shown in FIG. 2, the local communication means 10 are not provided to establish a direct communication between decoders, but rather to establish a bi-directional communication between the decoders and a central server 11. This central server receives communications from each decoder and stores them. Provision is also made to transmit messages to decoders that process said messages using the method described above.

The use of this central server 11 allows greater flexibility in message management. For example, it is possible to request the decoders to send receipt messages when they have received a message from a determined decoder. Thus, as an example, if the second decoder STB2 has received a message from the first decoder STB1, it is possible to wait for a relatively long time before said first decoder STB1 sends back a message to the second decoder STB2. On the other hand, if the third decoder STB3 has not received a message from the first decoder STB1 and the isolation duration is soon to end, it will be possible for the central server to send messages to the third decoder STB3 in a higher frequency, until the latter sends receipt.

Furthermore, thanks to this central server 11, even if a decoder is switched-off when a message should be received, the server will be able to send it to the latter as soon as the decoder is switched-on again. In fact, it is possible for example to anticipate that, when a decoder is switched-on after a stoppage period, it sends a request to the server to indicate to the latter that it is present in the system once again. Therefore, the server can send to said decoder the relative messages, so that if the messages conform with the fixed parameters, the decoder will again be immediately operational.

When a subscriber has two decoders, the situation is similar to the other, except for the fact that if a decoder has to be removed from the system for any reason, the second decoder will also be deactivated at the end of the isolation period. Thus, it will no longer be possible to decrypt any encrypted content. In the case of a subscriber having at least three decoders, it is possible to remove one decoder from the system without producing any consequences in the operation of the others. A potential solution consists in informing a management centre that one decoder must be removed from the system, and that therefore the other decoder should not be deactivated.

Another solution consists in allocating a privileged role to one of the decoders, for example to the one including the highest number of functionalities. This decoder is authorised to function independently of the other decoder. On the other hand, the second decoder always needs the first decoder to operate. In the case of malfunction or extended activation of the second decoder, the first will continue to operate. This solution is applied particularly in the case of a secondary decoder that is only used sporadically; for example a decoder in a guestroom that remains switched-off for long time. The main decoder continues operating and the secondary decoder can operate only after having been connected to the main decoder.

In the above description, it is indicated that communications are established between the decoders or between the decoders/security modules units. According to a variant, provision is also made for security modules themselves to include local communication means, made in the form of an antenna placed in a module such as a smart card. Thus, the sending, acceptance and processing of messages can be carried out directly through security modules, without passing through decoders.

This invention is particularly advantageous due to the fact that when a subscriber has several decoders, one of them may be displaced, for example for repairs or for a weekend, without impeding the operation of the other decoders. Furthermore, each decoder is equal and at the same time has the function of emitter and receiver. This allows the removal of any of the decoders from the system, which is not the case with a configuration where one of the decoders has a master function and the others a slave function.

The invention claimed is:

1. A method for managing conditional access data processing by at least three decoders associated to a subscriber and including activation and deactivation means for conditional access data processing and local communication means structured to allow communication between subscribers' decoders, each decoders executing said method, said method comprising at least the following steps:
   receiving by a first decoder's (STB) local communication means (10) at least one message originating from at least one second decoder (STB) associated to said subscriber;
   determining a minimum number of different decoders of said subscriber from which said first decoder must receive messages;
   comparing between, on one hand the number of different decoders from which said first decoder has received a message, and on the other hand the minimum number of decoders from which said first decoder must receive a message; and
   deactivating the conditional access data processing by said first decoder (STB) if it has not received messages from the required number of different decoders.

2. The management method according to claim 1, wherein the minimum number of decoders of said subscriber from which said first decoder must receive messages is at least equal to the absolute majority of the total number of decoders associated to said subscriber minus one and wherein each decoder executes said method.

3. The method according to claim 1, in which a period is determined during which, said first decoder must have received messages from a minimum number of different decoders, and in which the data processing is deactivated by said first decoder if the latter has not received messages from the required number of different decoders during said period.

4. The method according to claim 1, characterised in that the messages are transmitted from the second decoder to said first decoder directly.

5. The method according to claim 1, in which a subscriber is associated to at least three decoders, characterized in that the messages transmitted by one of said decoders are stored in at least one other decoder, and in that said first decoder receives messages from the other decoders, either directly or indirectly, by retransmission of the message stored in the other decoder.

6. The method according to claim 1, characterized in that at least said second decoder sends a message to a central server (11) having local communication and storage means, and in that said first decoder receives at least one message from said second decoder by means of said central server.

7. The method according to claim 1, characterized in that the messages include an identifier of said decoder that has issued this message.

8. The method according to claim 1, characterized in that the messages include a variable and in that the first decoder considers a message to be valid if this variable is different from one or more variables previously transmitted.

9. The method according to claim 8, characterized in that the variable is a counter value.

10. The method according to claim 8, characterized in that the variable permits the determination of the date and issue hour of the message.

11. The method according to claim 1, characterized in that the messages are encrypted by means of an encryption key.

12. The method according to claim 11, characterized in that the encryption key is unique for a determined pair of decoder and security module units.

13. The method according to claim 11, characterized in that the encryption key is common to the decoder and security module units for one subscriber.

14. A decoder for providing conditional access data processing, this decoder being associated to a subscriber and includes activation and deactivation means for processing this conditional access data and local communication means structured to allow local communication between said decoder and at least one other decoder associated to said subscriber, characterized in that it includes:

means for processing messages received by locals communication means (10), these processing means being structured to determine which decoder (STB) of the subscriber has issued the message;

means for determining and storing a minimum number of different decoders of said subscriber from which said decoder must receive messages; and means for comparing between on one hand the number of different decoders from which said decoder has received a message and on the other hand the minimum number of decoders associated to the subscriber, from which said decoder must receive a message.

15. The decoder according to claim 14, characterized in that it includes storage means for messages originating from another decoder and in that the local communication means (10) are structured for transmitting the stored messages to at least one other decoder.

16. The decoder according to claim 14, characterized in that it includes means for determining a duration, called isolation duration, said duration being defined as the maximum operational duration of a decoder for which the comparison between the number of received messages and the number of messages to be received gives a negative result.

17. The decoder according to claim 14, characterized in that it includes a removable security module, locally connected to the decoder and in that the local communication means (10), the means for processing messages, the determination and storage means and the comparison means are located in said security module.

* * * * *